(12) United States Patent
Karl (10) Patent No.: US 7,087,097 B1
(45) Date of Patent: Aug. 8, 2006

(54) FACILITY FOR THE GASIFICATION OF CARBON-CONTAINING FEED MATERIALS

(75) Inventor: Jurgen Karl, Markt Indersdorf (DE)

(73) Assignee: Technische Universitat Munchen Lehrstuhl fur Thermische Kraftanlagen (DE)

( * ) Notice: Subject to any disclaimer, the term of this patent is extended or adjusted under 35 U.S.C. 154(b) by 591 days.

(21) Appl. No.: 10/009,542

(22) PCT Filed: Jun. 9, 2000

(86) PCT No.: PCT/EP00/05364

§ 371 (c)(1),
(2), (4) Date: Jun. 3, 2002

(87) PCT Pub. No.: WO00/77128

PCT Pub. Date: Dec. 21, 2000

(30) Foreign Application Priority Data

Jun. 9, 1999 (DE) ................................. 199 26 201
Jun. 9, 1999 (DE) ................................. 199 26 202
Jun. 9, 1999 (DE) ................................. 199 26 203

(51) Int. Cl.
*C10J 3/16* (2006.01)
*B01J 8/18* (2006.01)
*B32B 5/02* (2006.01)
*F27B 5/02* (2006.01)

(52) U.S. Cl. ............................. 48/76; 48/202; 48/206; 48/78; 422/139; 422/140; 422/141

(58) Field of Classification Search .................. 48/202, 48/206, 210, 76, 78; 422/139, 140, 141
See application file for complete search history.

(56) References Cited

U.S. PATENT DOCUMENTS

| 4,032,305 A | * | 6/1977 | Squires ........................... 48/73 |
| 4,080,181 A | * | 3/1978 | Feistel et al. ................... 48/99 |
| 4,160,720 A | | 7/1979 | Seader et al. |
| 4,244,706 A | * | 1/1981 | Forney et al. ................ 48/202 |
| 4,474,230 A | | 10/1984 | McCallister |
| 5,064,444 A | * | 11/1991 | Kubiak et al. ................ 48/202 |
| 5,346,515 A | * | 9/1994 | Kubiak et al. ................ 48/73 |

(Continued)

FOREIGN PATENT DOCUMENTS

GB 1559398 9/1981

(Continued)

OTHER PUBLICATIONS

EU-Project: BioHPR Biomass Heat Pipe Reformer; NNE5-2000-000181; XP-002149822 Webpage; Oct. 1, 2000; 15:09—pp. 1-2; Jun. 10, 2000 15:04—pp. 1-2.

*Primary Examiner*—N. Bhat
(74) *Attorney, Agent, or Firm*—O'Melveny & Myers LLP (57) ABSTRACT

A pressure-supercharged fluidized-bed gasification chamber has a pressure-tight lock for supplying the feed materials which are to be gasified. The fluidized-bed gasification chamber is connected to a filter chamber via a connecting channel, with the result that the gas produced can flow over from the fluidized-bed gasification chamber into the filter chamber, where it is directed through the filter layer. An external heat source provides the necessary heat for the allothermic gasification. A heat-pipe arrangement directs the heat from the external heat source into the gasification bed of the fluidized-bed gasification chamber, in order to provide the temperature which is necessary for the gasification.

12 Claims, 6 Drawing Sheets

U.S. PATENT DOCUMENTS 5,439,491 A * 8/1995 Kubiak et al. .................. 48/99
6,331,283 B1 * 12/2001 Roy et al. .................... 423/652
6,550,011 B1 * 4/2003 Sims, III ..................... 713/193

FOREIGN PATENT DOCUMENTS

| GB | 1599398 | 9/1981 |
| GB | 2 164 660 A | 3/1986 |

* cited by examiner

FACILITY FOR THE GASIFICATION OF CARBON-CONTAINING FEED MATERIALS

BACKGROUND OF THE INVENTION

The invention relates to a facility for the gasification of carbon-containing feed materials, e.g. tar, tar sand, plastics waste, residues from paper and pulp production, residues from the petrochemical industry, electronics scrap and light shredded fractions, and in particular of biogenic feed materials, e.g. harvest waste, energy plants (Mishanthus) or wood chips. The facility serves, in particular, for producing combustible gases with a calorific value of at least 8 000 to 10 000 $kJ/m^3$.

The energy-related utilization of the abovementioned feed materials, at present, is largely limited to combustion. The gasification technologies are set up predominantly for producing weak gases with a calorific value of below 6 000 kJ/kg. These gases, however, are not suitable for utilization, for example, in gas turbines or fuel cells.

In order to produce gases with a calorific value of 8 000 to 10 000 $kJ/m^3$, so-called allothermic gasification has to be carried out. For this purpose, it is necessary for the fuel which is to be gasified to be fed sufficient external heat at a high temperature level of 500 to 900 degrees Celsius, which up until now has involved high technical outlay.

A significant widely used gasification process is the fluidized-bed process. This process may also be used to operate relatively small installations cost-effectively, but does not produce any high-calorie gases. For allothermic gasification in fluidized beds, essentially the following processes and facilities are currently undergoing testing.

Batelle Gasifier

In the case of the Batelle gasifier (two-stage fluidized-bed gasification), the reaction heat for the fluidized bed is produced in an external fluidized-bed combustion operation. The heat is transmitted by exchange of the hot sand bed and thus involves high technical outlay, see Peter Jansen, Thermische Vergasung von nachwachsenden Roh-und organischen Reststoffen [Thermal gasification of renewable raw materials and organic residues]; Institutsberichte der Bundesanstalt fur Landwirtschaft. [Reports of the federal institute for agriculture], Brunswick, 1997.

DMT Gasifier

In the DMT gasifier, a considerable amount of the heat which is necessary for the gasification is to be introduced in that use is made of steam, at a temperature of 750° C., which is superheated for the fluidizing operation. In addition, for the gasification of biomass, the intention is for heat-exchanger pipes to be directed through the fluidized bed, the flue gas with a temperature of 1 150° C. flowing through said pipes. It is barely possible, with the current state of knowledge, to verify that this facility can achieve calorific values of approximately 10 000 kJ/kg. Facilities which operate by this principle are disclosed in U.S. Pat. No. 5,064,444 and U.S. Pat. No. 5,439,491.

In order to increase the chemical conversion, attempts have thus been made to increase the introduction of heat into the fluidized bed by the use of pulse combustors, as is disclosed in U.S. Pat. No. 5,306,481. This method basically allows a relatively high level of heat introduction and thus a chemical conversion which is necessary for allothermic gasification. The use of pulse combustors, however, involves relatively high outlay.

Furthermore, U.S. Pat. No. 4,160,720 discloses a facility which is intended for the gasification of tar sand and in the case of which heat is transmitted into the reaction chamber by means of heat pipes. In the case of this facility, the tar sand runs through the reaction bed and the combustion zone. Since the pyrolysis gas mixes with the flue gas, there is a reduction in the calorific value of this gas, which is not suitable for direct use for gas turbines or for fuel cells.

SUMMARY OF THE INVENTION

It is thus an object of the invention to provide a facility for the gasification of carbon-containing and, in particular, biogenic feed materials which ensures a straightforward design and reliable operation and by means of which it is possible to produce combustible gases with a calorific value of at least 8 000 to 10 000 $kJ/m^3$. It is also an object of the invention to specify a fluidized-bed reactor which is particularly suitable for such a facility.

A pressure-supercharged fluidized-bed gasification chamber has a pressure-tight lock for supplying the feed materials which are to be gasified. The fluidized-bed gasification chamber is connected to a filter chamber via a connecting channel, with the result that the gas produced can flow over from the fluidized-bed gasification chamber into the filter chamber, where it is directed through the filter layer. An external heat source provides the necessary heat for the allothermic gasification. A heat-pipe arrangement directs the heat from the external heat source into the gasification bed of the fluidized-bed gasification chamber, in order to provide the temperature which is necessary for the gasification.

According to a preferred embodiment of the invention, the external heat is provided by means of combustion, in particular in a fluidized-bed combustion chamber.

In order that the filter layer does not grow as a result of the substances filtered out of the combustible gas, some of the growing filter layer is constantly drawn off into the combustion chamber through the solids flow channel. Since the filtered-out substances (ash and residual coke particles) are still combustible in part, they are burned in the combustion chamber. For this purpose, the combustion chamber is preferably connected to the filter chamber via a solids flow channel which is directed upward to the filter chamber. The bottom end section of the solids flow channel has a siphon arrangement in order to deliver material into the combustion chamber from the filter chamber.

The filter layer is drawn off, according to a further preferred configuration, via a first blowing-out arrangement at the bottom end section of the solids flow channel. In this case, the solids flow channel is preferably vertical, but always inclined and dimensioned such that, when the bottom blowing-out section of the solids flow channel is blown free, the solid material slides downward of its own accord under the action of gravitational force.

A second blowing-out arrangement is preferably provided at the top end section of the solids flow channel. This serves for rearranging and/or loosening the filter layer.

Controlling and regulating measures which are known to the person skilled in the art, and specifically the measurement of the gas pressures, determine when and how often the blowing-out arrangement has to be actuated in order to achieve optimum efficiency.

The particular advantage of the invention consists in that, depending on the adjustment of the pressure conditions, either more gas or more flue gas (heat) can be produced. The desired gas/flue gas ratio is preferably adjusted by means of a flue-gas-regulating arrangement, e.g. by the cross section of the flue-gas-outlet channel being changed, it being possible for this to be achieved by a flue-gas damper.

In an embodiment of the invention, the fluidized-bed gasification chamber is arranged, in spatial terms, above the filter chamber and the filter chamber is arranged above the combustion chamber. This arrangement results in a very compact construction with a good energy balance.

In another embodiment of the invention, there is provided an additional heat exchanger, which takes up the waste heat of the drawing-off flue gas and gives it off to the product gas, this likewise improving the energy balance.

In another embodiment of the invention, heat-exchanger ribs are arranged on the heat-exchanger sections of the heat pipes. These ribs are formed so as to assume an operative relationship with the streams and vortices of fluid produced by the fluidizing arrangements, such that the fluidized particles are accelerated transversely to their original flow direction. It is thus the case that good transverse mixing of the fluidized bed is achieved, the residence time of the particles in the fluidized bed is increased, gas bubbles are well dispersed, and the heat transfer from the heat-exchanger ribs to the fluidized bed is improved to a considerable extent. This also makes it possible to achieve a compact construction.

A fluidized-bed reactor in accordance with the invention is particularly suitable for use in a facility for producing combustible gas from carbon-containing feed materials according to the present invention. A reactor vessel which accommodates the fluidized bed is provided in the fluidized-bed reactor. Fluidizing arrangements for fluidizing a predetermined region of the fluidized bed are provided. In order for additional heat to be introduced or drawn off in this region, use is made of heat exchangers. The better the heat transfer between the heat exchangers and the fluidized bed, the higher is the efficiency of the installation. In order to improve this heat transfer, the heat-exchanger sections of the heat exchanger are designed as special heat-exchanger ribs which are formed and arranged so as to assume an operative relationship with the streams and vortices of fluid produced by the fluidizing arrangements, such that the fluidized particles are accelerated transversely to their original flow direction, as a result of which the transverse mixing of the fluidized bed is improved, the residence time of the particles in the fluidized bed is increased, and the heat transfer from the heat-exchanger ribs to the fluidized bed is improved to a considerable extent.

By using such a fluidized-bed reactor, smaller and more cost-effective overall sizes are possible, while maintaining the same output, as a result of the improved heat transfer. Such a fluidized-bed reactor may be used both in the combustion chamber and in the combustible-gas reactor of the facility for producing combustible gas from carbon-containing feed materials.

It should be emphasized that it is not possible or expedient to specify specific dimensioning for the special heat-exchanger ribs since the person skilled in the art can only implement such optimization in conjunction with a specific fluidized-bed reactor. It is thus possible, in individual cases, to use very specially designed heat-exchanger ribs which, in certain circumstances, may even be designed to be different, asymmetrical, etc. if this results in the abovedescribed deflection of the particles with the associated positive effects.

In another embodiment of the invention, the heat-exchanger ribs are connected releaseably to the heat-exchanger sections. This embodiment has a series of advantages: since, for example, fluidized beds in which combustion processes take place, on account of the relatively high temperature in conjunction with the sand of the fluidized bed, have a highly abrasive effect on internals, the heat-exchanger ribs are particularly effected thereby, i.e. they are subject to a high level of wear. The exchangeability of these parts which are subject to wear is thus particularly cost-effective.

In yet another embodiment of the invention, heat pipes are used. It is clear to the person skilled in the art that the positive effect provided by the invention is merely achieved by the particular configuration of the heat-exchanger ribs in conjunction with the fluidized bed. The combination of the special heat-exchanger ribs with heat pipes again allows a reduced overall size for maintaining the same output.

BRIEF DESCRIPTION OF THE DRAWINGS

The invention is explained hereinbelow with reference to two exemplary embodiments in conjunction with attached drawings, in which.

DETAILED DESCRIPTION OF THE PREFERRED EMBODIMENT

Figure 1:
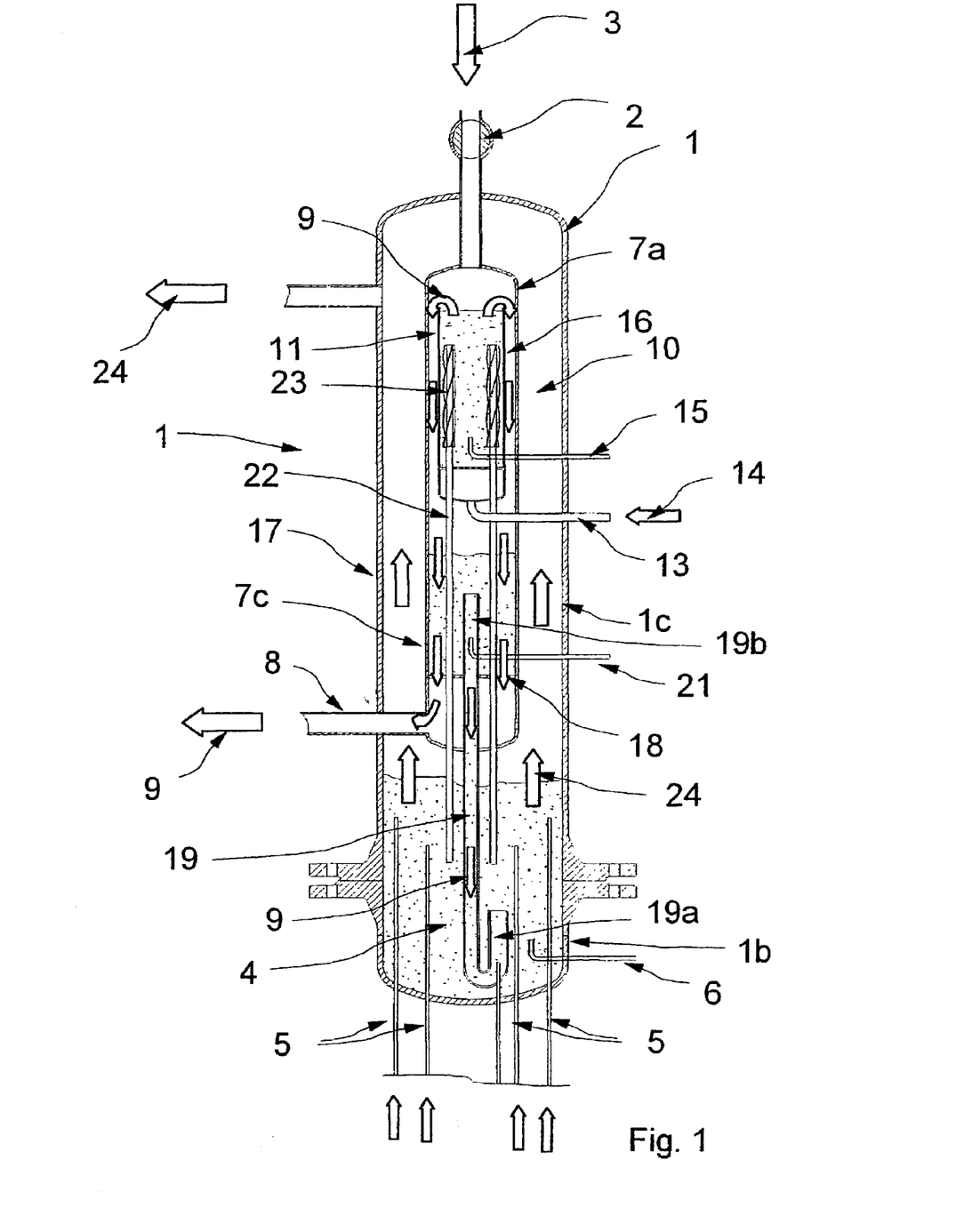
FIG. 1 shows a sectional illustration of a first embodiment of the invention.

FIG. 1 shows a first embodiment of the invention. A first tubular vessel 1 has, at its top end section 1a, a pressure-tight lock 2 for introducing the feed materials 3 which are to be gasified, and are illustrated symbolically by means of the arrow. Provided in the bottom end section 1b of the vessel 1 is a fluidized-bed combustion chamber 4, into which steam- and/or air-mixture feed nozzles project. For starting up, i.e. for heating up, a fuel feed nozzle 6 is arranged within the fluidized-bed combustion chamber 4 in order to blow in combustible gas by means of which the fluidized-bed combustion chamber 4 is heated up.

A second tubular vessel 7 is arranged concentrically in the vessel 1 and extends from the top end section 1a to the fluidized-bed combustion chamber 4. At its top end section 7a, this vessel 7 is connected in a sealed manner to the outlet of the lock 2. Arranged at the bottom end section 7b of the vessel 7 is a combustible-gas outlet 8 for discharging the combustible gas 9 obtained, said outlet not being connected to the interior of the vessel 1.

Arranged in the top section of the vessel 7 is a fluidized-bed gasification chamber 10, which is described hereinbelow.

The fluidized-bed gasification chamber 10 is a tubular vessel 11 which is open at the top. The vessel 11 is arranged such that the feed materials 3 introduced via the lock 2 drop into the vessel 11. A perforated base 12 is arranged at the bottom end section 11a of the vessel 11, and provided therebeneath is a steam inlet nozzle for the introduction of superheated steam. Arranged above the perforated base 12 is a fuel feed nozzle 15, which serves for the introduction of fuel which is required for starting up and, if appropriate, for controlling the gasification.

The fluidized-bed gasification chamber 10 is arranged concentrically in the vessel 7 such that the remaining annular gap 16 has a predetermined cross section.

Arranged in the bottom section of the vessel 7 is a filter chamber 17, which is described hereinbelow.

The filter chamber 17 comprises a wall section 7c of the second tubular vessel 7 and a filter-chamber perforated base 18, which is arranged above the combustible-gas outlet 8. A solids flow channel 19 is of tubular design and extends from the filter chamber 17, through the filter-chamber perforated base 18, into the fluidized-bed combustion chamber 4, the bottom section 19a of the solids flow channel 19 being curved upward. An upwardly directed bottom blowing-out nozzle 20 projects into said section 19a and the functioning of said nozzle will be explained at a later stage in the text. A further, upwardly directed top blowing-out nozzle 21 is arranged in the top section 19b of the solids flow channel 19.

Heat pipes 22 extend from the fluidized-bed combustion chamber 4, via the filter chamber 17, to the fluidized-bed gasification chamber 10, those end sections of the heat pipes 22 which project into the fluidized-bed combustion chamber 4 taking in heat and the end sections which project into the fluidized-bed gasification chamber 10 giving it off again there, in order to produce the necessary gasification temperature.

In the present example, helical heat-exchanger ribs 23 are arranged at those end sections of the heat pipes 22 which project into the fluidized-bed gasification chamber 10, with the result that transverse acceleration is produced by the upwardly directed steam and bed-material flow, this resulting not just in dispersion of resulting bubbles, but also in transverse mixing in the gasifier bed, by means of which there is an increase in the residence time of the fuel particles in the gasifier bed and thus in the conversion during the gasification. Furthermore, the heat transfer between the heat-exchanger ribs 23 and the gasifier bed is improved to a considerable extent.

The gasification process is described hereinbelow:

The gasification fluidized bed with the feed materials 3 is fluidized by superheated steam which is introduced via the perforated base 12, with the result that thorough mixing of the fluidized bed and of the solid fuels introduced via the lock arrangement is ensured. The basic functioning of fluidized-bed gasification is known to the person skilled in the art and will thus not be explained in detail.

The high level of heat transfer from the heat-introduction sections 24 of the heat pipes 22 to the fluidized bed guarantees a high level of heat introduction into the fluidized-bed gasification chamber. A high level of superheating of the steam introduced additionally ensures that it is possible to maintain temperatures between 500° C. and 700° C. for the pyrolysis and temperatures up to 800° C. for the gasification in the gasification bed. These high temperatures result, first of all, in the release of volatile constituents of the fuels and, finally, in the conversion of the released hydrocarbons (homogenous steam gasification) and of the residual coke (heterogeneous steam gasification). An excess of steam aids the conversion of the previously formed carbon monoxide with steam into carbon dioxide and hydrogen, as a result of which there is an additional increase in the fraction of hydrogen which is important for utilization in fuel cells.

The combustible gases 9 formed in the fluidized-bed gasification chamber 10 are directed, in the directions of the combustible-gas arrows 9, through the annular gap 16 into the filter chamber 17, in which first of all particles of coke and ash are separated off. As the combustible gas 9 flows through the filter bed, the combustible gas reacts with not yet converted steam, as a result of which the conversion, assisted by the catalytic action of the residual coke, is further increased.

Some of the combustible gas 9 flows into the fluidized-bed combustion chamber 4 via the solids flow channel 19 and some flows directly into the combustible-gas outlet 8 via the filter-chamber perforated base 18 in order to be supplied for external utilization. The division of the two streams of combustible-gas quantities is determined by the pressure loss in the combustible gas in the solids flow channel 19 and also by the pressure levels which prevail in the filter chamber 17, the line of the combustible-gas outlet 8 and in the fluidized-bed combustion chamber 4.

Particles of ash and of residual coke are transferred from the filter layer of the filter chamber 17 into the fluidized-bed combustion chamber 4 in that filter-bed material is discharged intermittently from the section 19a of the solids flow channel 19. The blowing-out nozzle is activated for this purpose.

Figure 3:
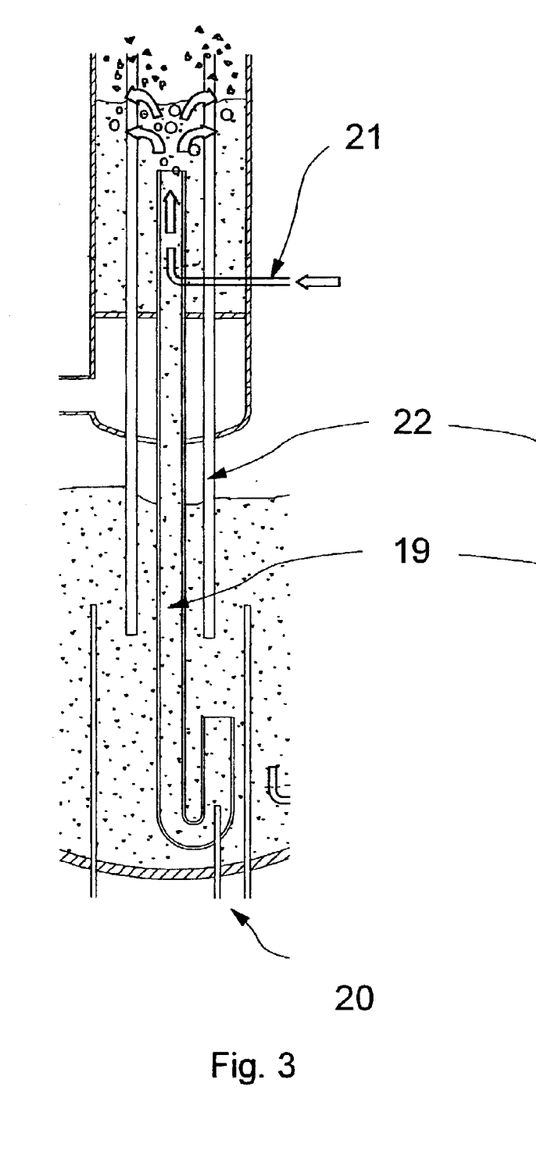
FIG. 3 shows the effect of the top blowing-out nozzle.

In order for bed material to be discharged from the solids flow channel 19 into the filter layer of the filter chamber 17, steam is blown in via the blowing-out nozzle 21, see FIG. 3. This achieves the situation where the bed material covers the deposited ash and the residual coke particles in layers.

The combustible gas 9 introduced into the fluidized-bed combustion chamber 4 is burned together with the residual coke fractions and tars separated off in the filter bed. Some of the heat released here is given off to the heat-accommodating sections of the heat pipes 22, which direct the heat to the fluidized-bed gasification chamber 10.

The rest of the heat is discharged from the fluidized-bed combustion chamber 4 with the flue gas 24 as perceived heat and is used outside the facility for producing superheated steam. This superheated steam is guided back wholly or partially into the facility as a gasification and fluidizing means.

In the present embodiment, nozzles 6 and 15 for introducing liquid or gaseous fuels are provided, in addition, in the fluidized-bed combustion chamber 4 and in the fluidized-bed gasification chamber 10. These nozzles serve, in particular, for heating up the facility during the starting-up process in order for it to be possible to use, for example, liquid biogenic fuels or in order for it to be possible to utilize liquid fuels or combustible gases which occur in external processes. This is expedient, in particular, when, for example during the operation of fuel cells in conjunction with the gasification facility, hydrogen is separated off in intermediate separating processes and the other constituents contained in the combustible gas (carbon monoxide, methane and higher hydrocarbons) are to be guided back for heat production.

In order to produce hot water, saturated steam or superheated steam, it is also possible for steam-generator pipes to be integrated, e.g. as ribbed pipes or immersion heating surfaces, wholly or partially in a fluidized-bed combustion chamber.

It should also be mentioned that the fluidized-bed combustion chamber has a conventional ash-discharge arrangement.

Figure 2:
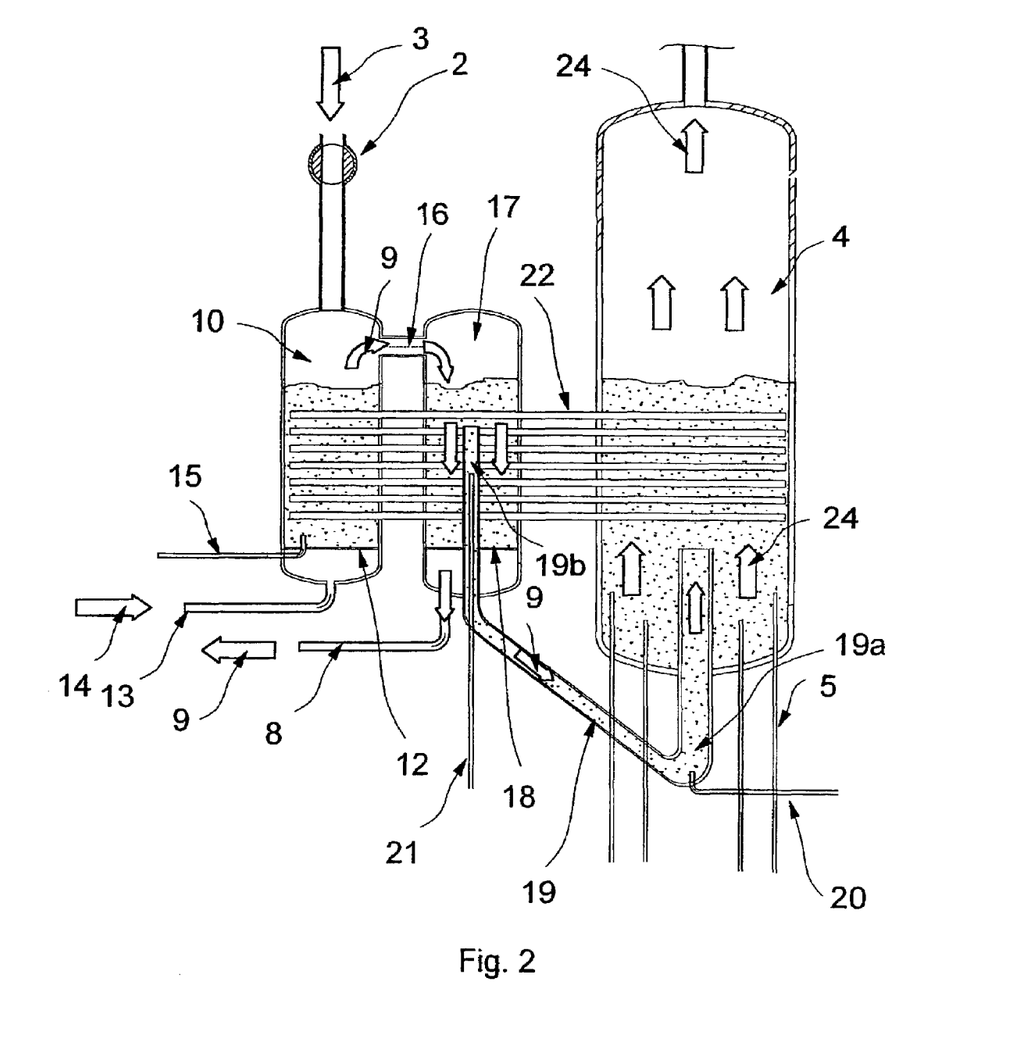
FIG. 2 shows a sectional illustration of a second embodiment of the invention.

FIG. 2 shows a further embodiment of the invention. In this embodiment, the fluidized-bed gasification chamber 10, the filter chamber 17 and the fluidized-bed combustion chamber 4 are arranged one beside the other and are likewise coupled thermally via the heat pipes 22. The same functional elements are provided with the same designations. In the case of functioning which corresponds to the first embodiment, the explanation is not repeated and you are thus referred to the explanation relating to FIG. 1.

The feed materials 3 which are to be gasified are introduced through the pressure-tight lock 2 and gasified as in the first embodiment. The combustible gas 9 passes, via the channel 16', into the filter chamber 17, flows through the latter and passes out of the combustible-gas outlet 8 in the filtered state. Some of the combustible gas is directed through the solids flow channel 19 and burned in the fluidized-bed combustion chamber 4.

As in the first embodiment, blowing-out nozzles 20 and 21 are arranged in the end sections 19a of the solids flow channel 19.

FIG. 3 shows the functioning of the top blowing-out nozzle 21. The arrows show how the material is fluidized and rearranged.

Figure 4:
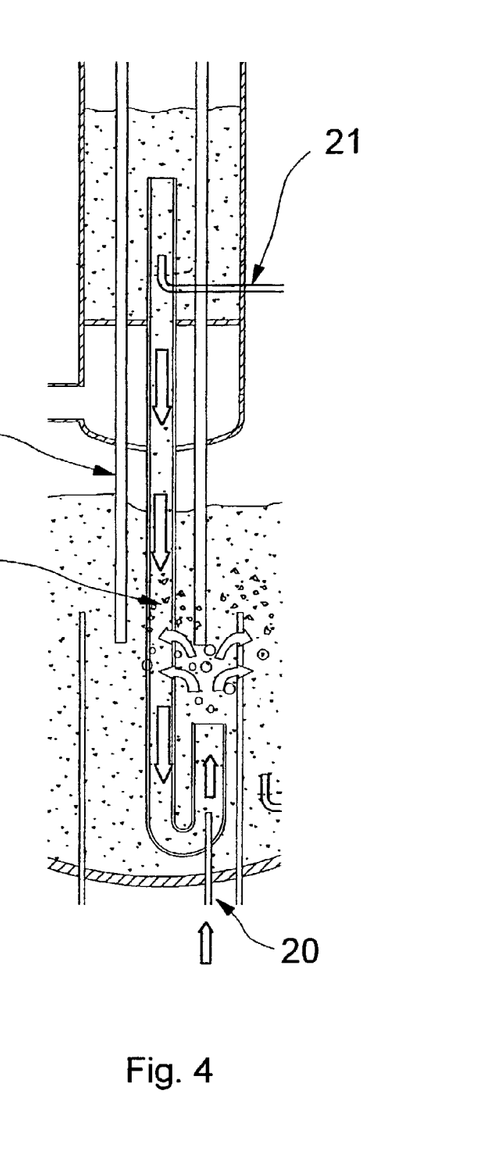
FIG. 4 shows the effect of the bottom blowing-out nozzle.

FIG. 4 shows the functioning of the bottom blowing-out nozzle 20. The arrows show how filter material is drawn off from the filter chamber and is fed to the combustion chamber for combustion purposes.

Finally, it should also be mentioned that it would be possible for the specific way of discharging material by means of the blowing-out nozzles 20 and 21 to be replaced by a mechanical discharge arrangement. Such a discharge arrangement, e.g. conveying screws, however, is/are more expensive than blowing nozzles and is/are susceptible to malfunctioning under the prevailing operating conditions, with the result the solution with the blowing nozzles is preferred.

Different embodiments of heating or cooling ribs on the heat-exchanger sections of the heat pipes are described hereinbelow with reference to FIGS. 5 to 8. These heating and cooling ribs are particularly suitable for the fluidizing-bed reactor according to the present invention and thus also for the fluidized-bed gasification chamber 10 and the fluidized-bed combustion chamber 4.

Figures 5, 6:
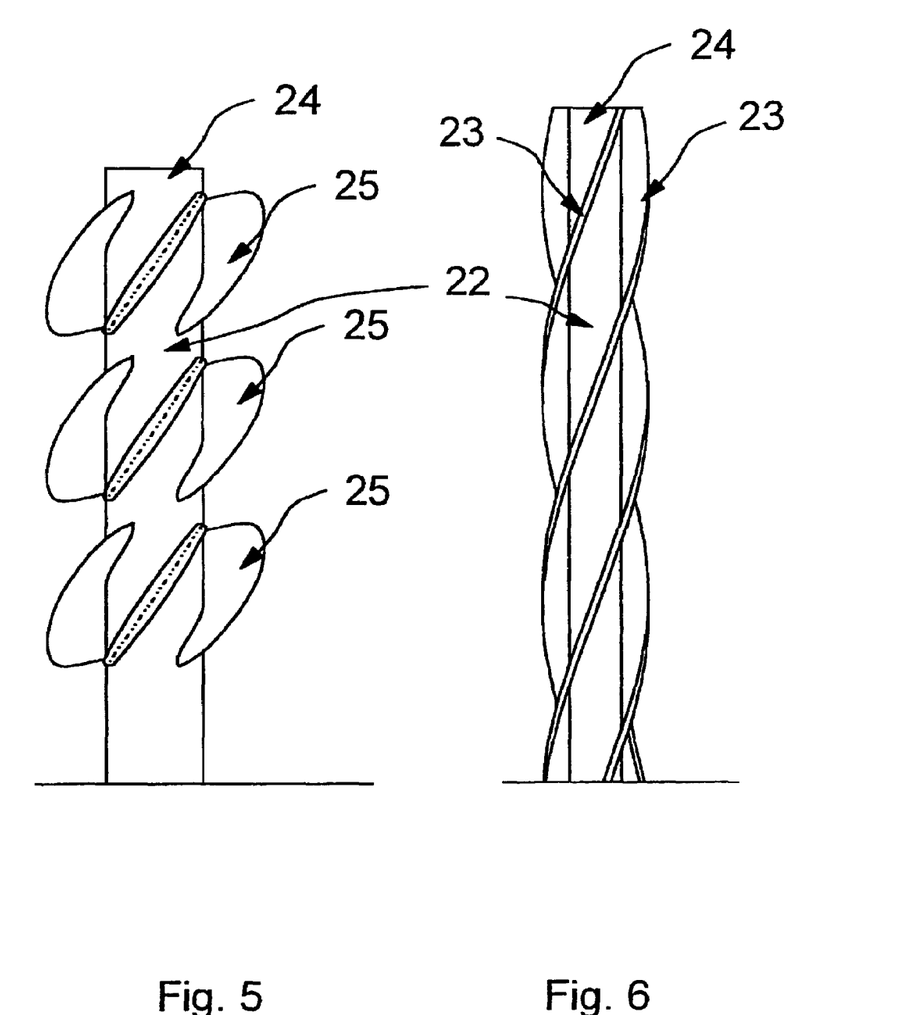
FIG. 5 shows a perspective illustration of a blade-design eat-exchanger rib on the heat-exchanger section of a heat exchanger.
FIG. 6 shows a perspective illustration of a helical heat-exchanger rib.

FIG. 5 shows an end section 24 of a heat exchanger, in particular in the form of a heat pipe 22, on which blade-design heat-exchanger ribs 25 are arranged.

FIG. 6 shows an end section 24 of a tubular heat exchanger or of a heat pipe 22 on which helical heat-exchanger ribs 23 are arranged.

Figure 7:
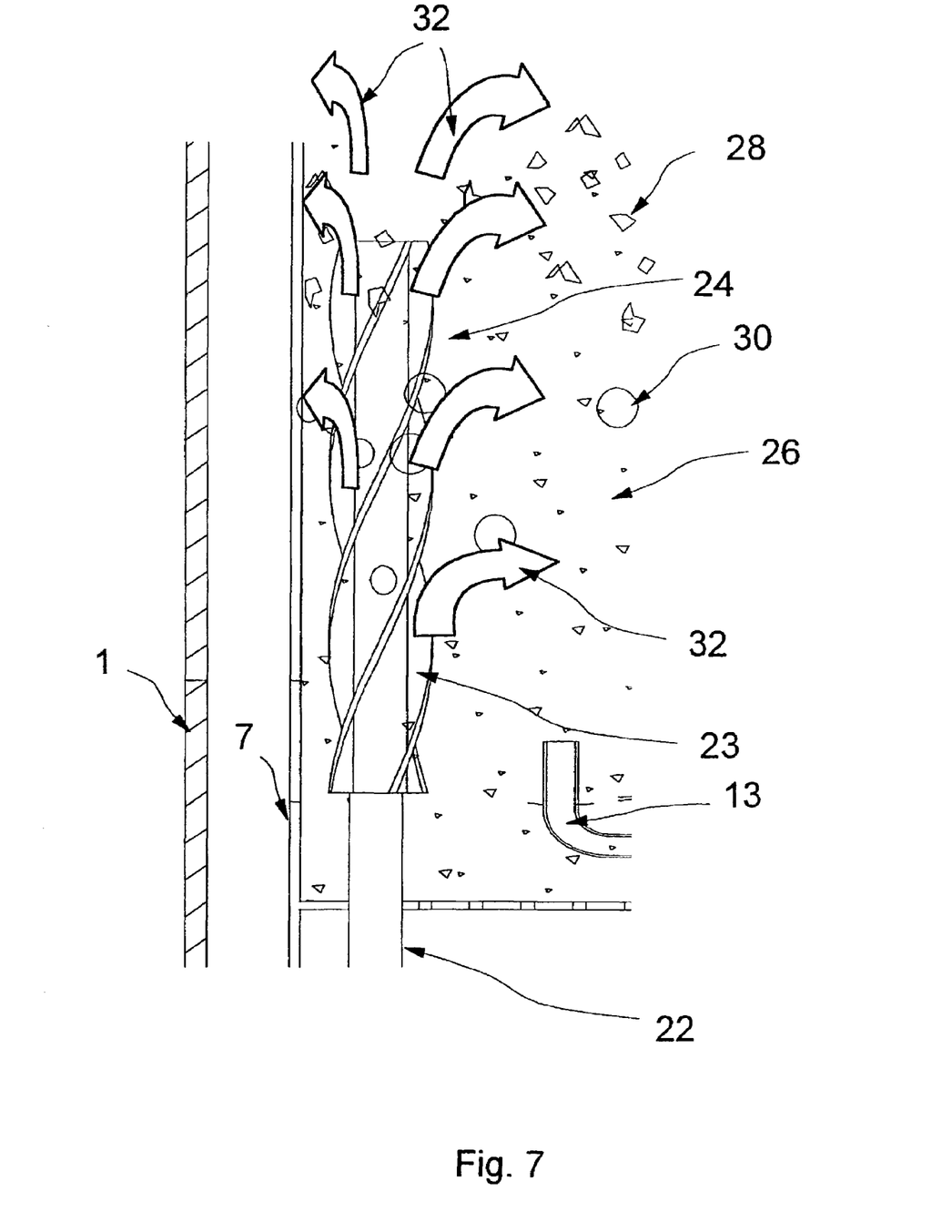
FIG. 7 shows a perspective functional illustration of the heat-exchanger rib according to FIG. 6.

FIG. 7 shows the tubular end section 24 of a heat exchanger 22 with helical heat-exchanger ribs 23 (such as in FIG. 6) in a fluidized bed 26 which consists, for example, of fuel particles 28 and in which gas bubbles 30 are rising. The arrows 32 show the direction in which the fuel particles 28 and the gas bubbles 30 are deflected. The fluidized bed 26 is assigned to a reactor vessel which corresponds to the tubular vessel 7 in FIG. 1. The outer vessel 1 from FIG. 1 is also illustrated laterally. FIG. 7 thus constitutes a detail of FIG. 1.

The fluidized bed is homogenized by said lateral deflection. At the same time, the fuel particles 28 remain in the fluidized bed longer, with the result that they are burned in their entirety. A longer residence time of the feed materials is also desirable in other reactions, e.g. gasification. The lateral deflection gives the particles very good heat contact with the heat-exchanger ribs 23, as a result of which the heat transfer is improved to a considerable extent and the efficiency is thus increased.

Figure 8:
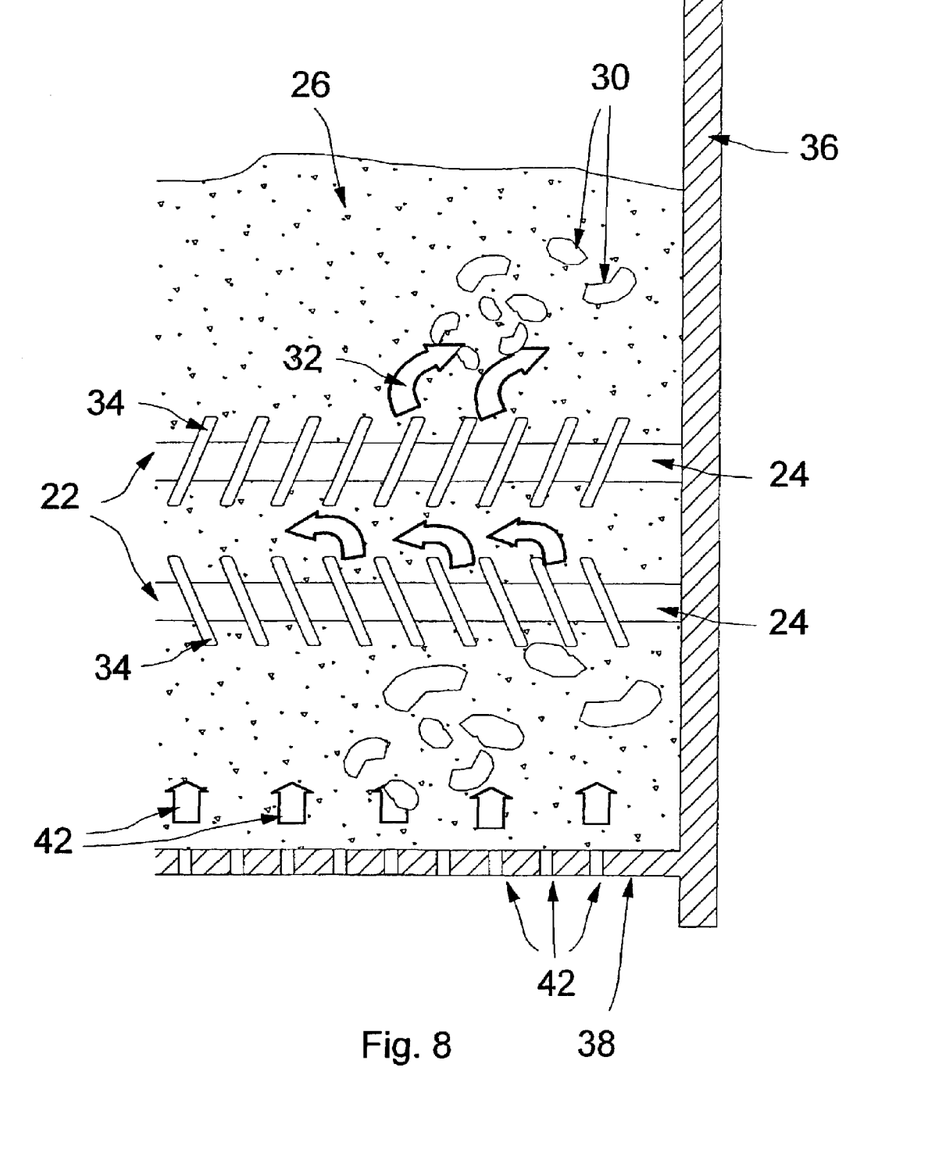
FIG. 8 shows heat-exchanger ribs which are arranged on horizontally located heat-exchanger sections.

FIG. 8 shows part of a fluidized-bed reactor with horizontally located heat-exchanger pipes 22 with heat-exchanger sections 24, on which heat-exchanger ribs 34 are arranged. The heat-exchanger sections 24 project horizontally into the fluidized bed 26, which is arranged in a reactor vessel 36. The reactor vessel 36 comprises a base plate which is designed as a perforated base 38 with holes 40. A fluidizing arrangement is illustrated by way of the holes 40 together with arrows 42.

In this embodiment, the heat-exchanger ribs 34 are inclined, the direction of inclination of the heat-exchanger ribs 34 having been changed in the heat-exchanger section 24 located above. The particles 28 and the steam bubbles 30 are thus deflected alternatively to the left or right, which results in good transverse mixing. It is thus clear to the person skilled in the art that the heat-exchanger ribs 34 according to the teaching of the invention are to be provided in the case of heat-exchanger sections 24 which are located obliquely.

The invention claimed is:

1. A facility for producing combustible gas from carbon-containing feed materials by allothermic steam gasification, the facility comprising:
   a pressure-supercharged fluidized-bed gasification chamber with a pressure-tight lock for supplying the feed materials that are to be gasified,
   a filter chamber connected to the fluidized-bed gasification chamber via a connecting channel,
   an external heat source, and
   a heat-pipe arrangement that takes up heat from the external heat source and gives it off to a gasification bed in the fluidized-bed gasification chamber.

2. The facility as claimed in claim 1, wherein the external heat source further comprises a fluidized-bed combustion chamber and has a flue-gas discharge line.

3. The facility as claimed in claim 2, wherein the fluidized-bed combustion chamber is connected to the filter chamber via a solids flow channel that is directed upward to the filter chamber,
   wherein the solids flow channel has a bottom end section connected to the combustion chamber,
   wherein the solids flow channel has a top end section connected to the filter chamber, and
   wherein a siphon arrangement is arranged at the bottom end section.

4. The facility as claimed in claim 3, wherein a first blowing arrangement is arranged in the bottom end section by use of suction action, in a controlled manner, for solids to be drawn off into the fuel bed of the combustion chamber from the filter bed of the filter chamber, with pulsating action.

5. The facility as claimed in claim 4, wherein a second blowing arrangement is arranged in the top end section of the solids flow channel or in the filter chamber in order to rearrange and/or loosen the filter bed of the filter chamber in a controlled manner.

6. The facility as claimed in claim 2, wherein a flue-gas-regulating arrangement is provided in the flue-gas discharge line in order to adjust the ratio of flue gas to product gas.

7. The facility as claimed in claim 1, wherein the fluidized-bed gasification chamber is arranged above the filter chamber and the filter chamber is arranged above the combustion chamber.

8. The facility as claimed in claim 2, further comprising an additional heat exchanger, which takes up the waste heat of the drawing-off flue gas and gives it off to the product gas.

9. The facility as claimed in claim 1, wherein heat-exchanger sections of the heat-pipe arrangement have heat-exchanger ribs which are formed and arranged so as to assume an operative relationship with the streams and vortices of fluid produced by the fluidizing arrangements, such that fluidized particles are accelerated transversely to their original flow direction, as a result of which transverse mixing of the fluidized bed is improved, the residence time of the particles in the fluidized-bed is increased, gas bubbles are well dispersed, and heat transfer from the heat-exchanger ribs to the fluidized-bed is improved to a considerable extent.

10. The facility as claimed in claim 9, wherein the heat-exchanger ribs are of helical or blade-like design.

11. The facility as claimed in claim 9, wherein, on horizontally located heat-exchanger sections, the heat-exchanger ribs are inclined obliquely to the blowing direction of the fluidizing means, the direction of inclination of the heat-exchanger ribs differing from adjacent heat-exchanger sections.

12. The facility as claimed in claim 11, wherein the heat-exchanger ribs are connected releaseably to the heat-exchanger sections, the connection providing good heat transfer.

* * * * *

UNITED STATES PATENT AND TRADEMARK OFFICE
CERTIFICATE OF CORRECTION

PATENT NO.       : 7,087,097 B1
APPLICATION NO.  : 10/009542
DATED            : August 8, 2006
INVENTOR(S)      : Jurgen Karl It is certified that error appears in the above-identified patent and that said Letters Patent is hereby corrected as shown below:

On Title Page should read
Item (73) Assignee: BIOAGE GMBH
                    Freising, Germany Signed and Sealed this Tenth Day of April, 2007

JON W. DUDAS
*Director of the United States Patent and Trademark Office*